United States Patent [19]
Galassi et al.

[11] Patent Number: 5,919,308
[45] Date of Patent: Jul. 6, 1999

[54] CONVEYANCE OF DYNAMO-ELECTRIC MACHINE COMPONENTS IN RESIN APPLICATION SYSTEMS

[75] Inventors: Rossano Galassi; Romano Lozzi; Sabatino Luciani, all of Florence, Italy

[73] Assignee: Axis USA, Inc., Tampa, Fla.

[21] Appl. No.: 08/757,968

[22] Filed: Dec. 5, 1996

Related U.S. Application Data

[60] Provisional application No. 60/019,237, Jun. 4, 1996.

[51] Int. Cl.⁶ .............................. B05C 5/00; B05C 19/02; B65G 43/09
[52] U.S. Cl. ........................ 118/324; 118/421; 118/322; 198/346.2; 198/612
[58] Field of Search .................................. 118/324, 300, 118/322, 407, 410, 416, 423, 421; 198/570, 605, 610, 608, 612, 346.2; 427/116, 104, 127, 287; 29/DIG. 63, DIG. 39

[56] References Cited

U.S. PATENT DOCUMENTS

| | | | |
|---|---|---|---|
| 4,249,068 | 2/1981 | Mangan et al. | 219/497 |
| 4,963,391 | 10/1990 | Bair et al. | 427/116 |
| 5,401,531 | 3/1995 | Faraoni et al. | 427/12.7 |
| 5,443,643 | 8/1995 | Cardini et al. | 118/712 |

FOREIGN PATENT DOCUMENTS

| | | |
|---|---|---|
| 0 321 223 | 6/1989 | European Pat. Off. . |
| 0 622 128 | 2/1994 | European Pat. Off. . |
| 499224 | 11/1970 | Switzerland . |

*Primary Examiner*—David A. Simmons
*Assistant Examiner*—Calvin Padgett
*Attorney, Agent, or Firm*—Fish & Neave; Robert R. Jackson; Brajesh Mohan

[57] ABSTRACT

A resin coating system includes a coating station for applying resin to dynamo-electric machine components such as electric motor armatures, one or more other stations adjacent to the coating station, a conveyor for transporting components through the coating station where the components are carried by holders holding at least one end of the components without touching the body portion of the components, another conveyor for transporting components through the other stations where the components are carried by holders supporting the body portion of the components, and a transfer device for transferring uncoated and coated components between the two conveyors. The holders attached to the conveyor in the coating station are capable of rotating the components about the longitudinal axis of each component during the coating operation for an even application of the resin to the component. The holders attached to the conveyor for transporting armatures through the other stations are of simpler and less expensive construction.

8 Claims, 6 Drawing Sheets

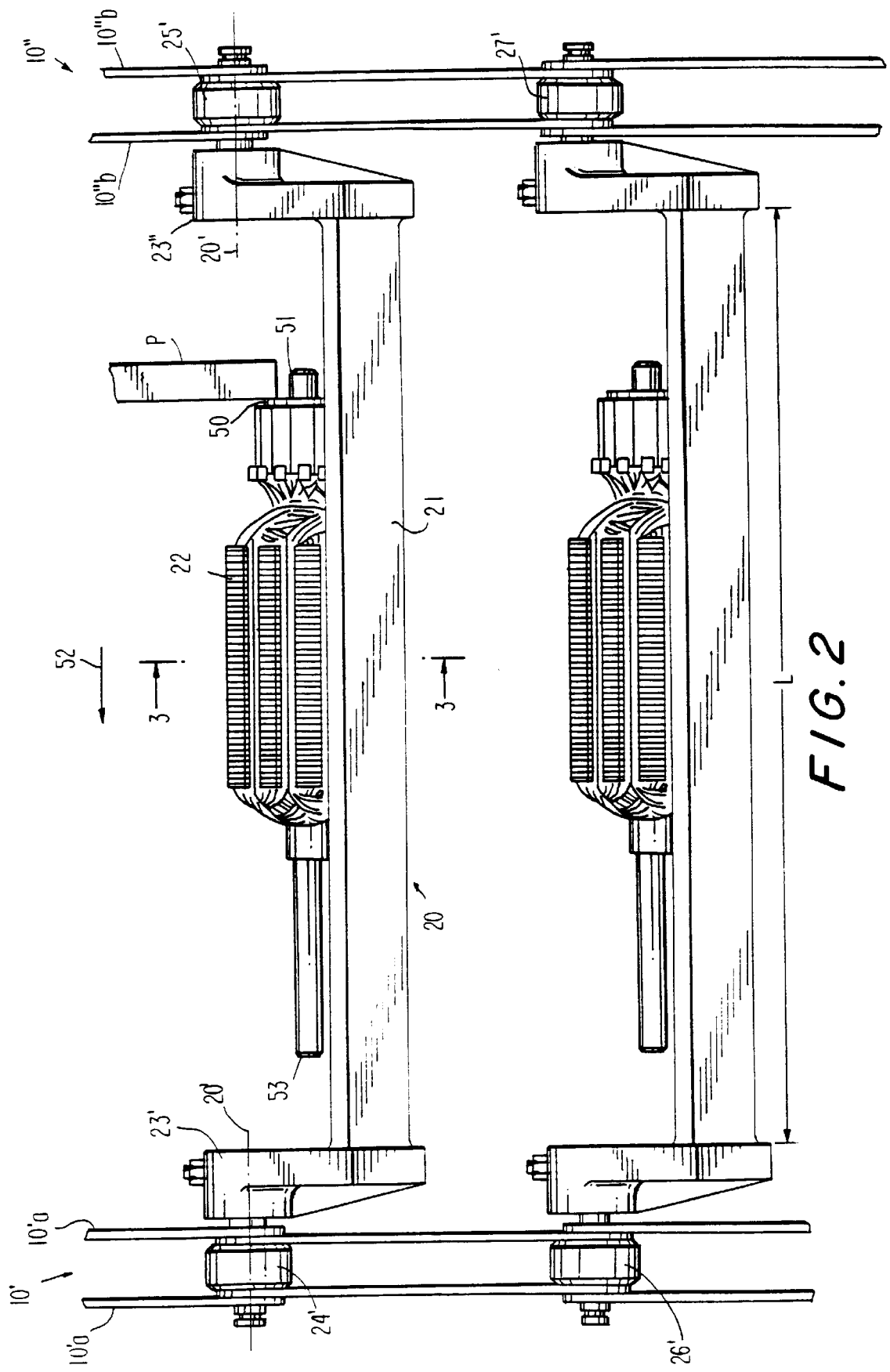

CONVEYANCE OF DYNAMO-ELECTRIC MACHINE COMPONENTS IN RESIN APPLICATION SYSTEMS

This application claims the benefit of U.S. provisional application No. 60/019,237, filed Jun. 4, 1996.

BACKGROUND OF THE INVENTION

The present invention relates to improved solutions for conveying dynamo-electric machine components (e.g., armatures or stators for electric motors, generators, or alternators) in resin application systems. These systems have process principles like those described in U.S. Pat. Nos. 5,401,531 and 5,443,643, which are hereby incorporated by reference herein.

More particularly, a typical resin application system involves impregnating or at least coating the wound coils of a dynamo-electric machine component by dropping liquid resin from a series of dispensers which become aligned with portions of the coil. While this dropping operation occurs, the dynamo-electric machine components rotate under the dispensers so that the resin becomes uniformly distributed on the coils. In traditional systems this operation is accomplished by holding the dynamo-electric machine components with holding devices like those shown in FIG. 4 of U.S. Pat. No. 5,443,643. These holding devices are fixed to a transport chain at a constant distance from each other and have collets for gripping a shaft of the dynamo-electric machine component (in this case an armature). By supporting the ends of the dynamo-electric machine components, these holding devices leave the body portion of the components free from support so that only the components and not the holding devices are coated with resin. A mechanism is also present to produce the rotation which has been described previously.

As an alternative to dropping the resin on the components, it is known to pass the components over a resin bath, which is raised so that a portion of the component is immersed in the resin. The component is then rotated by its holding device so that all portions of its circumference pass through the resin. The bath is lowered after all circumferential portions of the component have received resin.

The above-mentioned holding devices with component rotating capability are certainly satisfactory for manipulating the dynamo-electric machine components with respect to resin dispensers or a resin bath. However, they are expensive to manufacture and their cost becomes an even greater burden when the resin application system needs to have a long chain with a great number of holders to transfer the dynamo-electric machine components to additional equipment like a preheating oven, a curing oven, and/or a cooling plant.

There are other holding devices, such as those shown in FIG. 2 of U.S. Pat. No. 5,401,531, which can be used as satisfactorily as those referred to previously for transporting dynamo-electric machine components through a traditional resin application system. However, these other holders are just as expensive as those described initially.

In view of the foregoing, it is an object of this invention to provide solutions for avoiding the costly result described previously for a resin application system requiring a long chain transport for conveying dynamo-electric machine components through the system.

It is another object of the invention to provide a resin application system which uses two or more sets of dynamo-electric machine component holders, where the more expensive type of holders are used substantially only in the portions of the system where they are required.

SUMMARY OF THE INVENTION

These and other objects of the invention are accomplished in accordance with the principles of the invention by providing a system having a plurality of endless conveyors which transport dynamo-electric machine components to be coated with resin through all of the stations required for proper coating of the components. Such stations may include a preheating station, a resin coating station, a curing station, a cooling station, and/or a gelification station, as shown in greater detail in U.S. Pat. Nos. 5,401,531 and 5,443,643. In some of the stations, such as in the resin coating station, it may be desirable to use a first set of component-carrying holders that are capable of rotating the components during coating so that the resin is applied evenly to the components. In the other stations where rotation of the components is not necessary, it is preferable to use simpler holders of the present invention which accommodate a range of different sized components and yet are easier and less expensive to manufacture than the first set of holders.

Thus, in the resin application system of the present invention the expensive holding devices for transporting and presenting the components to resin dispensers or a resin bath are maintained, while less expensive and differently configured holding devices are used for transportation to other parts of the system.

BRIEF DESCRIPTION OF THE DRAWINGS

Further features of the invention, its nature, and various advantages will be more apparent from the following detailed description of the preferred embodiments and the accompanying drawings, wherein like reference characters represent like elements throughout, and in which:

FIG. 2 is an elevational view of two successive, illustrative, holding devices fixed to a transport chain in accordance with the principles of this invention. FIG. 2 is taken along the line 2—2 in FIG. 1.

FIG. 3 shows a holding device on a horizontal rather than vertical section of the transport chain.

FIG. 4 shows the holding device on a vertical section of the transport chain again.

DETAILED DESCRIPTION OF THE PREFERRED EMBODIMENTS

Figure 1:
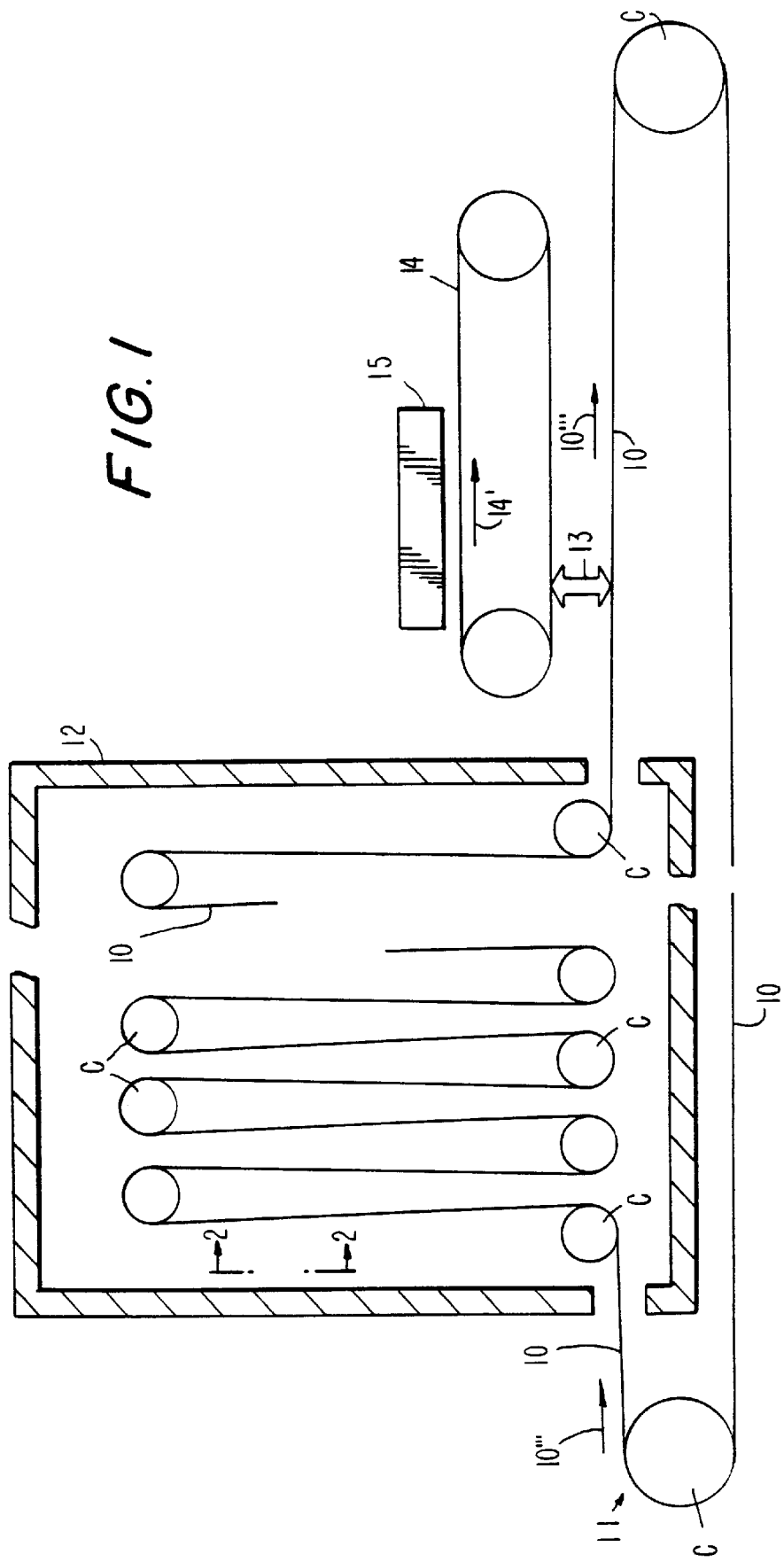
FIG. 1 is a schematic representation of an illustrative resin coating system which can be constructed in accordance with the principles of this invention.

FIG. 1 shows the chain transport routes in an illustrative resin application system using the principles of this invention. With reference to this FIG., transport chain 10 having holding devices according to the principles of this invention, by means of intermittent advancement in direction 10''', achieves transport from position 11, where a load device transfers dynamo-electric machine components to be coated with resin and components which have been coated between a main manufacturing line (not shown) and the holding devices of this invention. In the embodiment shown in the drawings, the dynamo-electric machine components are assumed to be electric motor armatures, but it will be understood that other types of components (e.g., stators) can be processed in accordance with the invention if desired.

After position 11 the chain continues to transport through pre-heating oven 12, where the components (e.g., armatures) are heated to a temperature required for the successive resin coating operation. Once the armatures leave the oven, in position 13 they are unloaded from stretch 10 and placed in holding devices like those shown in FIG. 4 of U.S. Pat. No. 5,443,643, belonging to a separate transport chain 14 required for transferring the armatures to resin application station 15. In station 15 dispensers apply the resin in the way that has been described previously for traditional resin application systems. (Note again that station 15 could be a resin bath raised and lowered from below the armatures, rather than resin dispensers dropping resin from above the armatures.) To transfer the armatures to the resin application station, chain 14 has a closed loop extension returning to position 13 and advances intermittently in direction 14'.

In position 13, an important transfer operation occurs during the waiting period between two successive advancements of chains 10 and 14, which need to be synchronized. More particularly, an armature to be coated with resin is transferred from a holding device of this invention fixed to chain 10 to a traditional holding device of chain 14, and vice versa a coated armature is transferred from a traditional holding device of chain 14. These two exchanges of armatures occur in succession and between the same holding devices of the chains. In other words, for each armature to be coated which is unloaded from transport chain 10 and loaded on to transport chain 14, a coated armature is unloaded from transport chain 14 and loaded onto transport chain 10, and these armatures exchange their respective holding devices.

The coated armatures which have been transferred to transport chain 10 travel back to position 11 so that they can be unloaded to the main manufacturing line. During this transfer, gelification of the resin can occur if the resin being used requires this type of process.

Other chain routes before and after position 13 in FIG. 1 are possible with the principles of this invention, and additional equipment, not shown in FIG. 1, may be present. For example, during a gelification process, it may be desirable to rotate the components to avoid accumulation of resin in certain areas due to the force of gravity so that the resin will be uniformly distributed within and over the coils. Then, the conventional type of holders, such as those shown in FIG. 4 of U.S. Pat. No. 5,443,643, may be used in the gelification process. The gelification process may therefore be advantageously performed along transport chain 14 downstream from coating apparatus 15. Once the resin is no longer likely to flow under the influence of gravity, the armatures can be transferred back to transport chain 10 at position 13. Further processing of the armatures can then be performed along transport chain 10 downstream from position 13. For example, this further processing may include passing the armatures through a curing oven for further hardening the resin, and then passing the armatures through a cooling plant for restoring the armatures to ambient temperature before they are returned to the other armature processing apparatus at position 11.

Different types of transfers may be used at locations like position 13 in FIG. 1. For example, conveyors 10 and 14 may be side by side or end to end rather than one above the other at component transfer location 13. In the case of resin application by a bath, it may be preferable to simultaneously transfer several armatures between conveyors 10 and 14 at position 13 (because it may be more efficient to batch several armatures for simultaneous treatment in a bath). Also, in that case each advance of conveyor 14 may be equal to the spacing of several holders (rather than the spacing of just one holder). Depending on the type of resin being used, it may not be necessary to have a preheating oven 12 before coating station 15, but a heating oven may be required after the coating station.

Accordingly, chain routes, conventional holders, and holding devices of this invention may be combined in a variety of ways in accordance with the principles of this invention. By means of these principles the present invention reduces the number of traditional holders to just those required on the limited stretch of transport chain 14 required for transfer to the resin dispensing station and closely associated processes such as gelification as described above.

Figure 4:
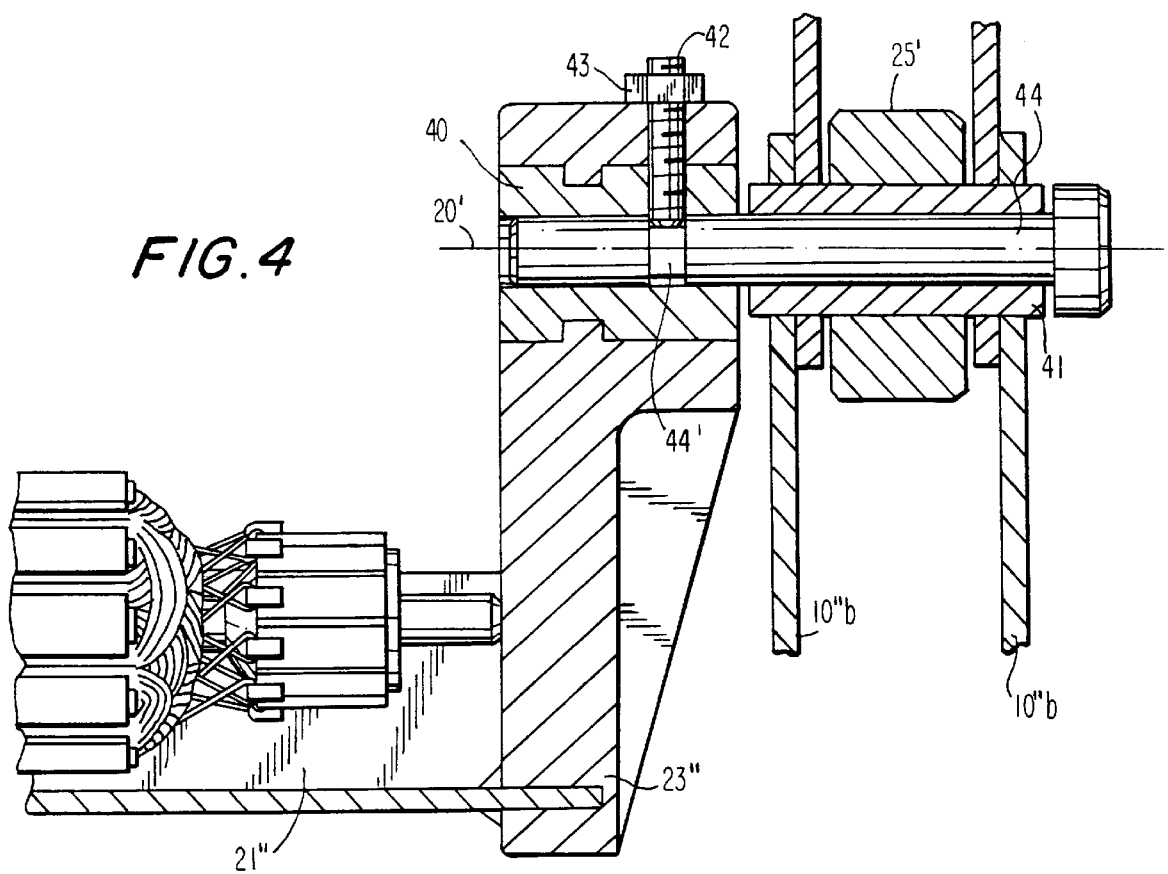
FIG. 4 is a partial sectional view of a holding device in accordance with the principles of this invention, taken generally along the line 4—4 in FIG. 3, although
Figure 3:
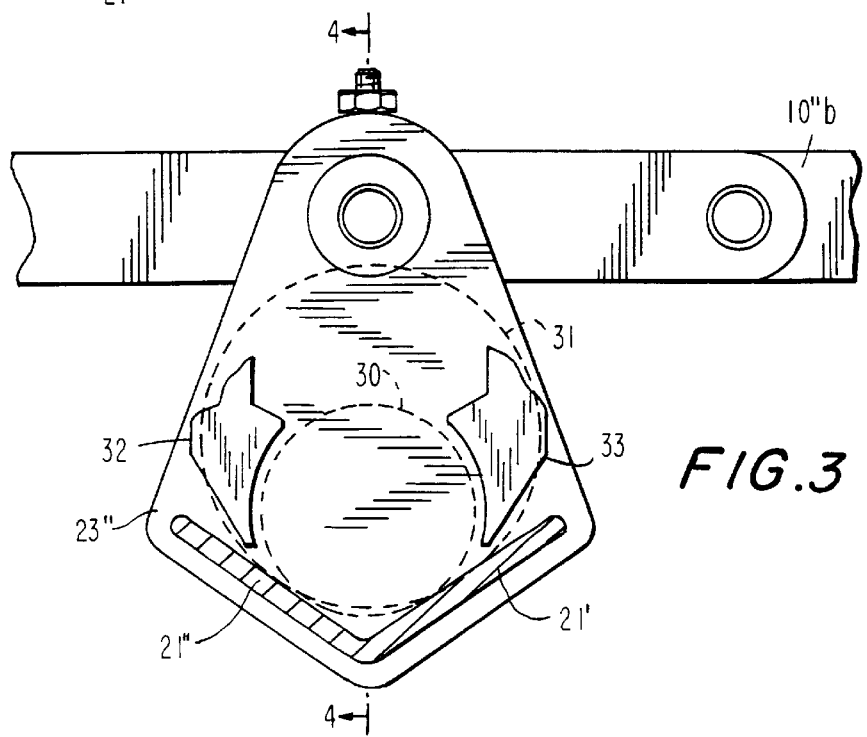
FIG. 3 is a sectional view taken generally along the line 3—3 in FIG. 2, although

With reference to FIGS. 2–4, an illustrative holder in accordance with this invention for use on transport chain 10 has a main case aluminum body 20 with a transverse portion 21 for supporting the ferro-magnetic core or stack 22 of the armature that is being carried. The coils of the armature are wound on the stack. The transverse portion has a V section consisting of extensions 21' and 21" for providing support contacts with the armature stack. The armature is supported in this transverse portion due to the contact of its stack 22 with these extensions 21' and 21". This contact is maintained by the weight of the armature. At the ends of the transverse portion there are upward portions 23' and 23" which include devices for connecting the holder to the transport chain. The transport chain consists of two spaced stretches of chain 10' and 10" having links 10'$a$ and 10"$b$ and rollers 24', 25', 26' and 27'. Rollers 24'–27' run on surfaces placed along the route of conveyor 10 which is shown in FIG. 1 so that proper travel without excessive friction and deformation of the chain can be achieved.

With reference to FIG. 3 circles 30 and 31 represent the outer contour of two extreme armature stack diameters of a range of armatures which can be supported by the holder. The holder does not need adjustments to be able to support any of the stack diameters belonging to this range. Grippers like 32 and 33 are used to grasp the stack 22 of an armature when it is necessary to transfer the armature at locations like 11 and 13 in the system shown in FIG. 1.

FIG. 4 shows the devices for connecting the holder to the transport chain. With reference to this FIG., upward portion 23" has a transverse bore in which a hard metal support bush 40 is permanently fixed. Bush 41 is assembled in a bore passing through the links of the chain and through roller 25'. Hinge pin 44 is passed through bush 41 and through support bush 40 which are co-axial. Screw 42, fastened by nut 43, extends into groove 44' of the hinge pin and together with abutment head 44" impedes it from moving along the length of both the bushes. In this way the holder is fixed to the hinge pin, while the hinge pin is free to rotate in bush 41. A similar structure is present on upward portion 23' for connecting the other side of the holder to chain 10'.

By means of this technique for connecting the holder to the chains, the holder is able to swing around axes 20' under the weight of the armature which it is carrying. This guarantees that the holder remains with the V portions 21' and 21" facing upwards, thus carrying an armature in a stable way even when the chain travels around curves to change its travel direction as is required in points referenced C in FIG. 1.

When it is required to position an armature which is being transported by a holder in a precise and predetermined position along transverse width L, an external pusher like P can be used to contact either the back end of the commutator as at 50 or with the tip of the armature shaft 51 to push the armature in direction 52 and parallel to transverse width L so that the opposite tip 53 of the armature shaft comes into abutment with the inner side of upward portion 23'. By doing this the armature can be precisely referenced within the holder for loading and unloading using grippers 32 and 33, which need to be precisely aligned with a predetermined portion of the armature stack 22.

Figure 5:
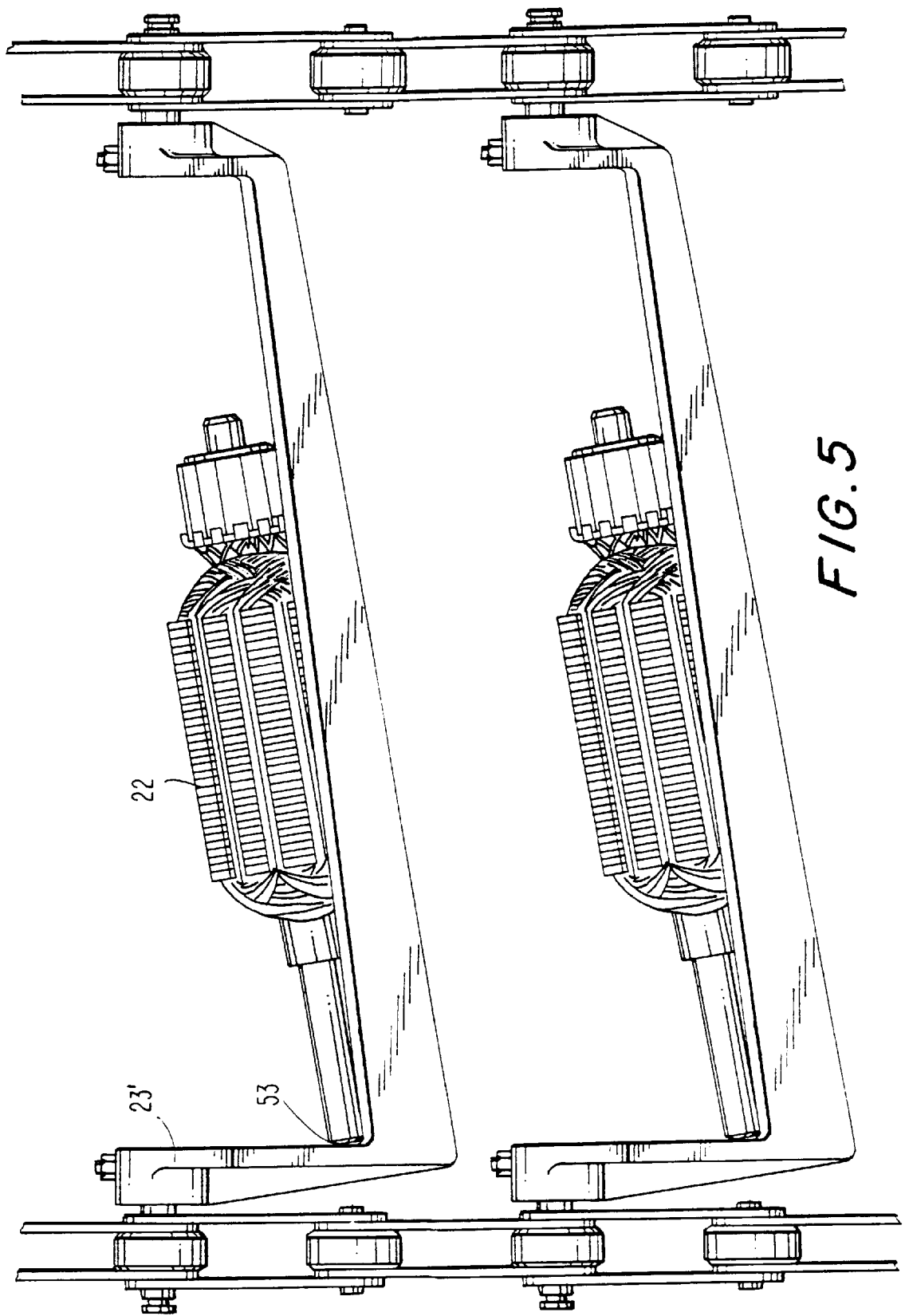
FIG. 5 is a view similar to FIG. 2 showing another illustrative embodiment of holding devices constructed in accordance with the principles of this invention.

In FIG. 5, which is similar to the view of FIG. 2, a slightly different version of holder 20 is shown with a transverse portion that is slightly inclined. The armatures which are placed in the holder of FIG. 5 will slide by gravity towards the left of that FIG. so that opposite shaft tip 53 will be permanently in abutment with the inner side of upward portion 23' when the armature is being carried. This avoids the use of external pusher P for referencing the armatures.

Figure 6:
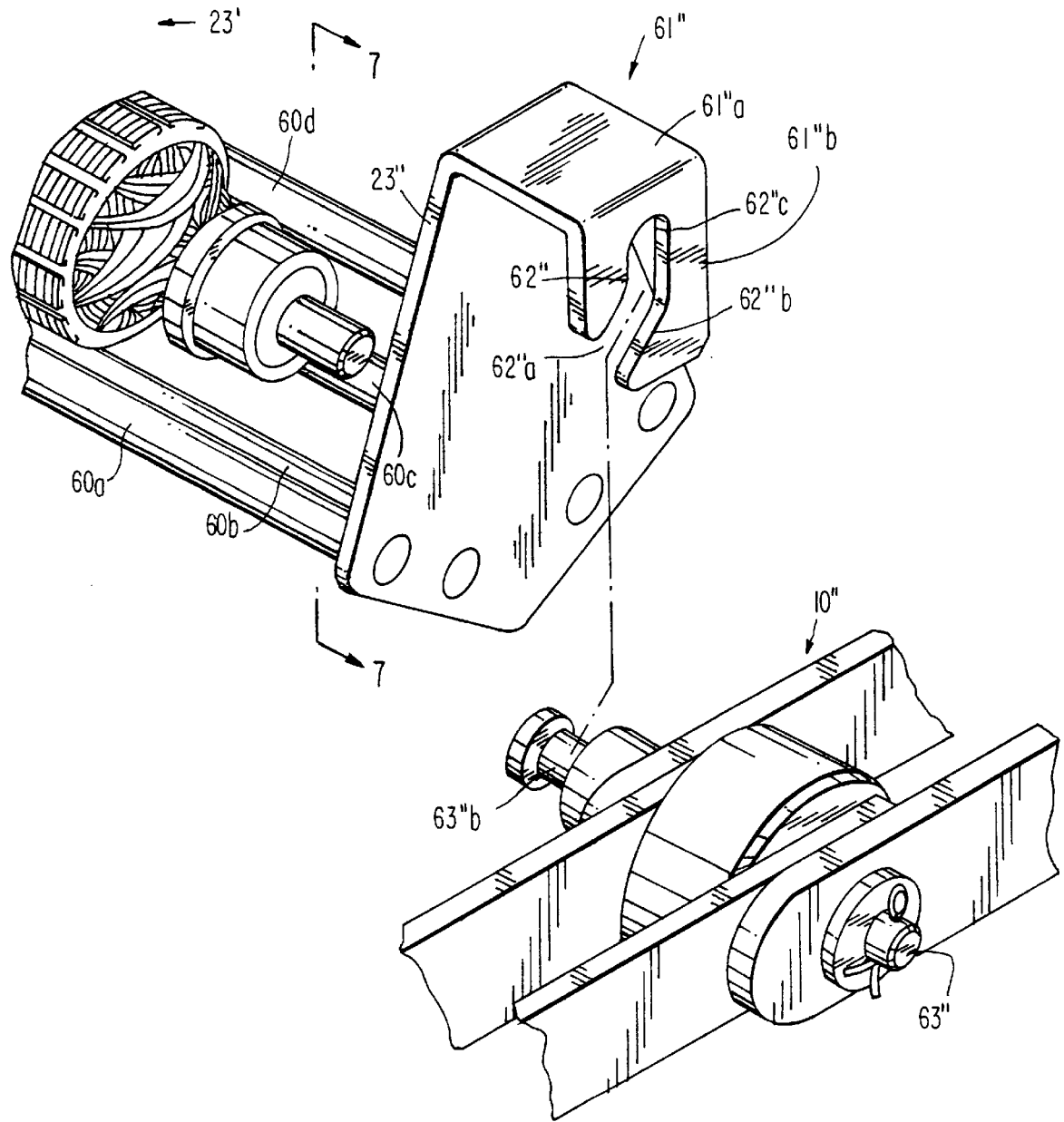
FIG. 6 is a partial, partly exploded, isometric view of an alternative illustrative embodiment of a holding device in accordance with this invention.
Figure 7:
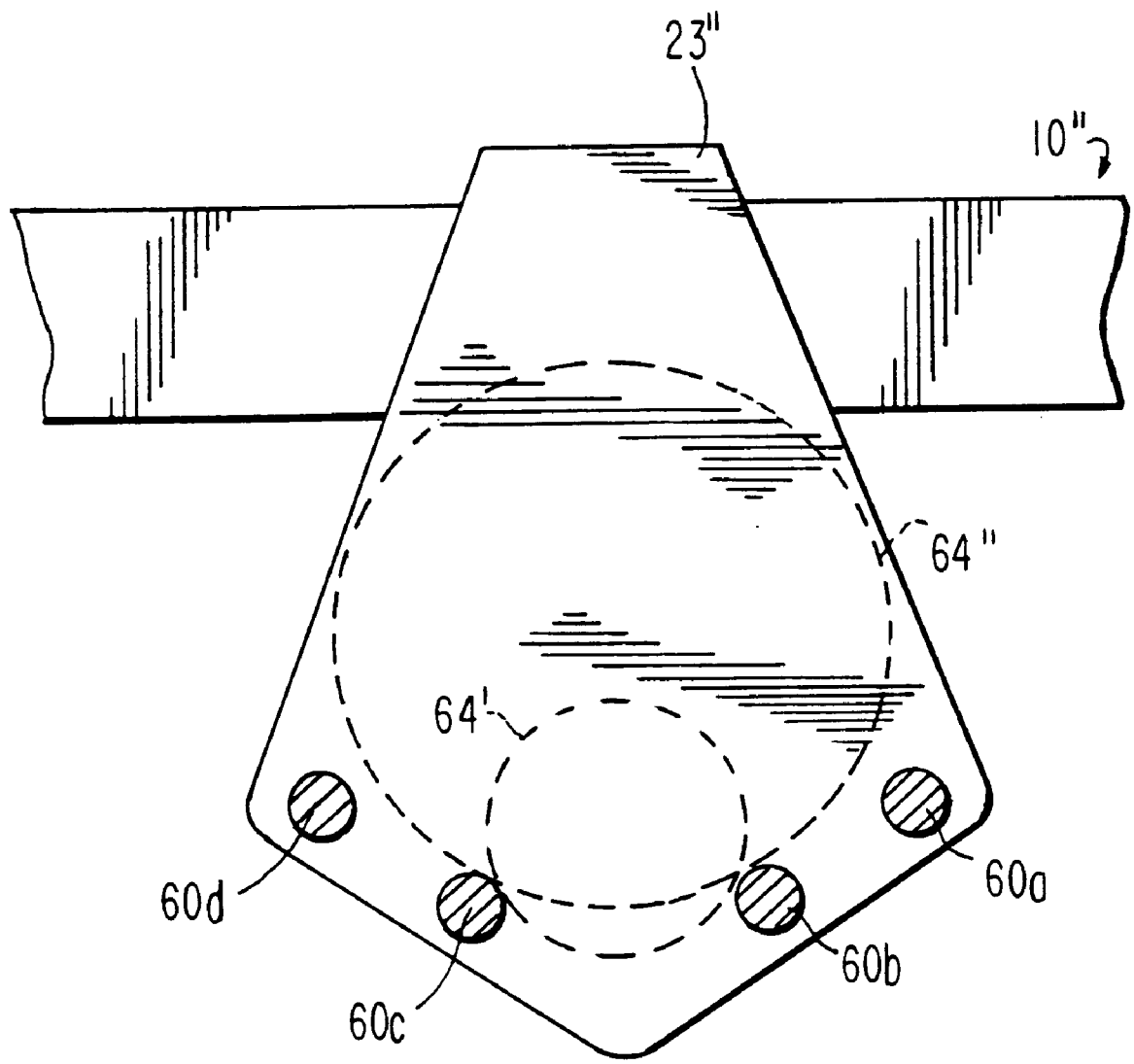
FIG. 7 is a sectional view taken along the line 7—7 in FIG. 6.

An alternative solution for a holding device used on transport chain 10 in FIG. 1 is shown in FIGS. 6 and 7. In this holding device, cylindrical bars 60a, 60b, 60c and 60d form the transverse portion 21 which supports an armature by its stack 22. These bars connect upward portion 23' (not shown) to an opposite upward portion 23" shown in FIGS. 6 and 7. Upward portion 23" has device 61" for connecting the holder to transport chain 10".

Device 61" is an extending portion of the same plate structure which forms upward portion 23". More particularly, device 61" includes horizontal plate portion 61"a and continues with downwardly directed vertical plate portion 61"b. Portion 61"b is machined by means of a milling operation to have slot 62" for receiving circumferentially reduced portion 63"b of pin 63" mounted on chain 10". Slot 62" is configured to have entrance 62"a, inclined portion 62"b and cylindrical portion 62"c.

Similarly, upward portion 23' (not shown) will have an identical connection device 61' (not shown) facing oppositely to 61" for mounting of the opposite side of the holder to a circumferentially reduced portion of a pin 63' (not shown) fixed to chain 10'. Connection device 61' will have an identical slot 62' with entrance 62'a, inclined portion 62'b and 62'c (all not shown) for receiving the circumferentially reduced portion of pin 63'.

The holding device of FIGS. 6 and 7 can be easily and quickly connected to chains 10' and 10" by means of a manual operation. To do this, entrances 62'a and 62"a are first aligned with circumferentially reduced portions of pins 63' and 63". Then the holding device is moved toward pins 63 to allow the circumferentially reduced portions to run along the inclined portions 62b and to finally reach the cylindrical portion 62c where they become definitely seated. In this way, the manual operation obtains connection of the holding device to pins 63 in a definite manner for transport of an armature by movement of the chain. The fits of the sides of the slots 62 with respect to the reduced portions 63b of the pins are loose to allow the connections to be made without difficulty, without tools, and to reach a final condition where the holding device can swing on the reduced portions of the pins during movement of the chain. The position of the center of gravity and the weight of the holding device shown in FIGS. 6 and 7 will maintain the reduced portions of pins 63 seated in the cylindrical portions 62c of the slots at all times during transport by the chain. The additional weight of the armature being transported further assures this condition.

FIG. 7 shows how different sizes of armature stack 64' and 64" are supported under their weight on bars 60b and 60c. These bars are connected to upward portions 23' and 23" by inserting the ends of the bars in bores of the plate structure forming the upward portions. Covering weld points over the ends of the bars and to the plate structure once they have been seated in the bores make the connections rigid and permanent. Bars 60a and 60d act as abutment sides to the stack if the armature tends to topple off bars 60b and 60c. Bars 60a and 60d also act as centering surfaces when the armatures are loaded into the holding device. Bars 60b and 60c have smooth external surfaces in contact with the armature stack to facilitate sliding for referencing as has been described for FIGS. 2 and 5.

The holding device of FIGS. 6 and 7 needs less metal material to manufacture and leaves open the areas between the bars. These characteristics make this type of holding device less expensive to manufacture, lighter for transportation, easier to heat, and more open to air circulation around an armature on the holding device when passing through a heating oven. The easy and quick connection of the holding device to the chain makes cleaning, repair, and substitution operations more efficient.

It will be understood that the foregoing is only illustrative of the principles of the invention, and that various modifications can be made by those skilled in the art without departing from the scope and spirit of the invention. The described embodiments are presented for the purpose of illustration rather than limitation, and the present invention is limited only by the claims which follow.

The invention claimed is:

1. Apparatus for processing dynamo-electric machine components which include a ferro-magnetic core and coils of wire wound on said core, said apparatus comprising:

a first assembly for applying liquid resin to said coils;

a second assembly for performing another operation on said components at a location which is spaced from said first assembly;

a first transport mechanism for transporting said components through said first assembly, said first transport mechanism comprising a plurality of first holding devices each of which is adapted to support said components at an axial end leaving said core free from direct support;

a second transport mechanism for transporting said components through said second assembly, said second transport mechanism comprising a plurality of second holding devices, each of which is adapted to support said core of said components; and a transfer mechanism for transferring said components between said first and second transport mechanisms.

2. The apparatus defined in claim 1 wherein each of said first holding devices rotates said components about an axis of said components.

3. The apparatus defined in claim 1 wherein each of said second holding devices defines a substantially V-shaped support beneath the core of each of said components.

4. The apparatus defined in claim 3 wherein said V-shaped support comprises a member having a substantially V-shaped cross section.

5. The apparatus defined in claim 3 wherein said V-shaped support comprises a plurality of substantially parallel rods which are laterally spaced from one another so that their longitudinal axes pass perpendicularly through a plane at points that are spaced along a V-shape in said plane.

6. The apparatus defined in claim 3 wherein each of said V-shaped supports is rotatably supported on a structure for advancing said supports.

7. The apparatus defined in claim 6 wherein the center of gravity of each of said supports is laterally spaced from the axis about which said support is rotatably supported on said structure so that the inflection point of said V-shape tends to remain downwardly directed.

8. The apparatus defined in claim 7 wherein each of said supports is retained on said structure substantially solely by gravity acting on said support.

* * * * *